No. 793,967.

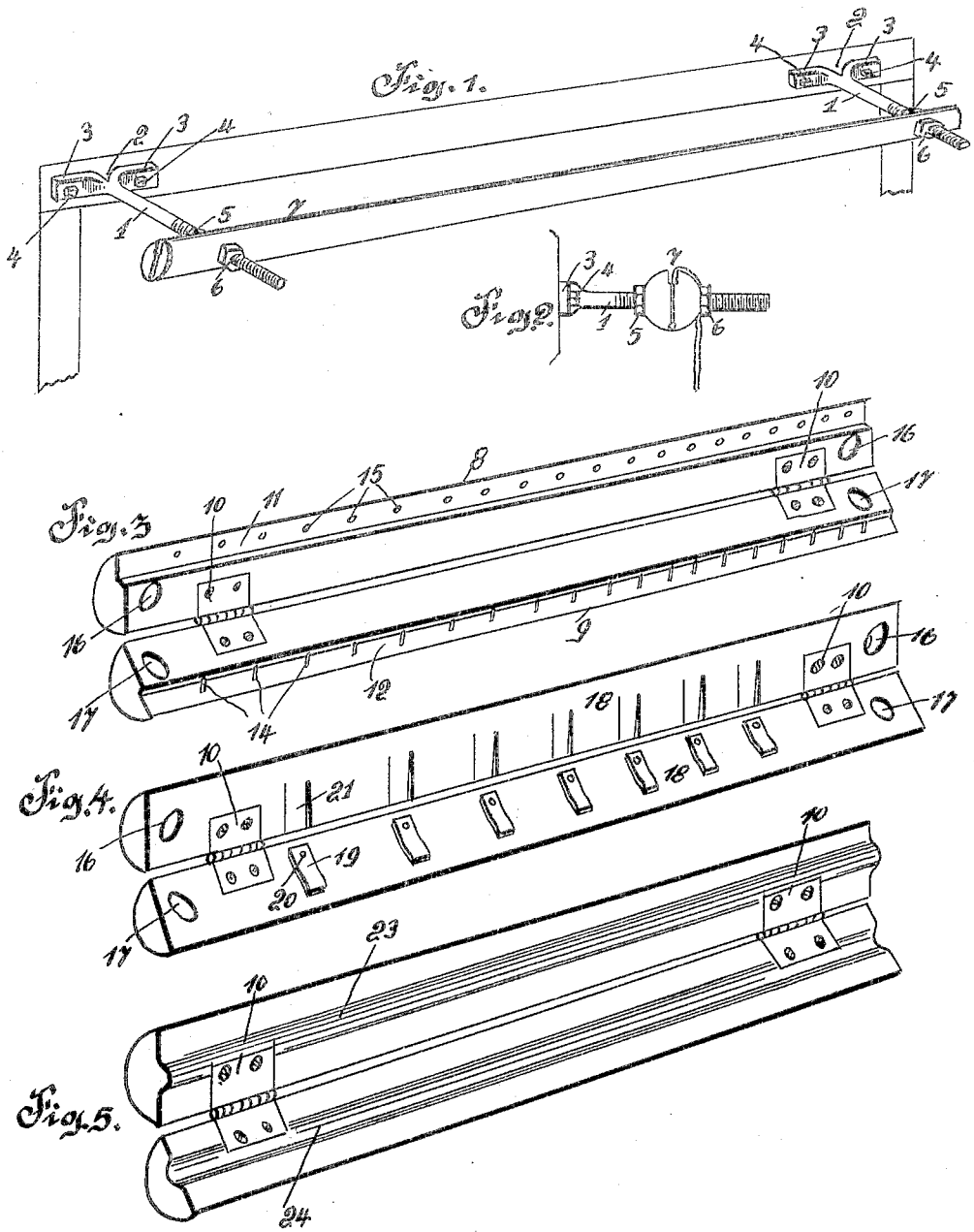

Patented July 4, 1905.

UNITED STATES PATENT OFFICE.

HARRY JAMES UPPERMAN, OF PITTSBURG, PENNSYLVANIA.

CURTAIN-POLE.

SPECIFICATION forming part of Letters Patent No. 793,967, dated July 4, 1905.

Application filed March 20, 1905. Serial No. 250,969.

*To all whom it may concern:*

Be it known that I, HARRY JAMES UPPERMAN, a citizen of the United States of America, residing at Pittsburg, in the county of Allegheny and State of Pennsylvania, have invented certain new and useful Improvements in Curtain-Poles, of which the following is a specification, reference being had therein to the accompanying drawings.

This invention has relation to certain new and useful improvements in curtain-poles; and the invention has for its object to provide a novel form of pole to which a plurality of curtains can be easily and quickly secured.

Another object of this invention is to provide a curtain-pole wherein the use of rings and pin curtain-fasteners are dispensed with, thus dispensing with a great deal of labor heretofore required in hanging and draping curtains.

A further object of this invention is to provide a novel form of bracket which is adapted to be used in connection with my improved curtain-pole.

With the above and other objects in view the invention finally consists in the novel construction, combination, and arrangement of parts, which will be hereinafter fully described and then specifically pointed out in the claims, and, referring to the drawings accompanying this application, like numerals of reference designate corresponding parts throughout the several views, in which—

Figure 1 is a perspective view of my improved curtain-pole. Fig. 2 is an end view of the same, illustrating the pole mounted upon one of my improved brackets. Fig. 3 is a perspective view of one form of my improved pole, illustrating the same in an open position. Fig. 4 is a similar view of a modified form of construction that may be used in connection with my improved pole, and Fig. 5 is a fragmentary perspective view of still another form of curtain-pole.

To put my invention into practice, I have devised a novel form of bracket, which is illustrated in Figs. 1 and 2 of the drawings. The bracket is preferably made of metal, and by referring to Fig. 1 of the drawings it will be observed that the body portion of the bracket consists of a screw-threaded shank 1, the one end of which is bifurcated, as indicated at 2, and the arms 3 3, formed by the bifurcation of the shank, are bent outwardly and are pierced to receive screw-bolts 4 4, whereby the bracket can be secured to a window-frame or frame of a doorway, if it be desired to so position the curtains. I provide the screw-threaded shank with nuts 5 and 6, the nut 5 serving as a jam-nut, while the nut 6 serves to secure the curtain-pole 7 upon the screw-threaded shank 1. It will of course be understood that a plurality of these brackets may be employed, the number depending upon the length of pole to be supported, and by employing the jam-nut 5 the position of the curtain-pole relative to its support can be readily adjusted.

In Fig. 3 of the drawings the curtain-pole 7 is illustrated in an open position, and by referring to said figure it will be observed that the pole consists of two substantially semicylindrical members 8 and 9, which are hinged together, as indicated at 10 10. The confronting faces of these members are recessed, as indicated at 11 and 12. The face of the recess 12 is provided with a plurality of pins 14, and the face of the recess 11 is provided with a plurality of apertures 15, which are adapted to receive the pins 14 of the recess 12. I have recessed each one of the members 8 and 9, whereby one or more curtains can be readily positioned upon the pins 14 and retained within the curtain-pole when the members 8 and 9 are folded together. To hold these members in closed position, I have provided the ends of each of the members with apertures 16 16 and 17 17, which are adapted to horizontally aline with one another, whereby the curtain-pole in its entirety can be placed upon the screw-threaded shanks 1 of the brackets and retained thereon by the nuts 6.

It will be observed that in the accompanying drawings I have illustrated modified forms of construction which may be used in connection with my improved pole, and one of these forms is illustrated in Fig. 4, where it will be seen that the members 18 18 are similar in construction to the members 8 and 9 heretofore described, and the only difference between this modification and the preferred form of construction (illustrated in Fig. 3 of the drawings) resides in the employment of spring-clips 19 19, which are secured to one of the members, as indicated at 20. The opposite member is provided with a plurality of recesses 21 21, which are adapted to receive the spring-clips 19 when the members are folded together. The spring-clips 19 19 are adapted to engage a curtain and retain the same between the members 18 18 of the curtain-pole when it has been placed upon the brackets heretofore described.

In Fig. 5 of the drawings still another modified form of construction is illustrated, and it will be observed that in this form of curtain-pole I have entirely dispensed with the use of pins and spring-clips and have simply provided the member 22 of the curtain-pole with a longitudinally-disposed rib or projection 23, which extends from one end of the member to the other end. This rib or projection is adapted to fit within a longitudinally-disposed groove 24, formed in the member 25 of the curtain-pole, and the rib 23 is adapted to impinge one or more curtains within the groove 24 when the members 22 and 25 are folded together.

From the foregoing description, taken in connection with the drawings, it will be observed that one or more curtains can be easily and quickly arranged within my improved pole and may be draped in any desired manner over the pole after it has been positioned and secured upon the novel form of brackets which I employ. It is obvious that I may employ either one of the constructions shown; but I preferably use the form illustrated in Figs. 1 to 3 of the drawings. However, I do not care to confine myself to the specific construction of pole illustrated, as various changes may be made in the details of construction without departing from the general spirit and scope of the invention.

What I claim, and desire to secure by Letters Patent, is—

1. The combination with brackets embodying a shank having its inner end adapted for attachment to a window-frame, of a pole embodying two members hinged together, each section being pierced adjacent the ends to receive said shanks, and means on the shank of said brackets at opposite sides of the pole to hold the latter thereon and secure the sections in the closed position.

2. In a curtain-pole, the combination with brackets having screw-threaded shanks, nuts mounted upon said shanks, of a curtain-pole, said pole consisting of two semicylindrical members hinged together, the ends of said members having apertures formed therein adapted to aline with one another and receive the screw-threaded shanks of said brackets, said members having recesses formed therein, and means to secure a plurality of curtains within said recesses substantially as described.

3. In a device of the type described, the combination with brackets having threaded shanks, of a curtain-pole, said pole consisting of two substantially semicylindrical members hinged together, the ends of said pole, having apertures formed therein adapted to receive said threaded shanks, and means to secure said pole upon said shanks, substantially as described.

4. In a device of the type described, the combination with brackets having threaded shanks, of a curtain-pole, said pole consisting of two substantially semicylindrical members hinged together, means carried by said members to retain a plurality of curtains between said members, and means to secure said members together, upon said shanks, substantially as described.

In testimony whereof I affix my signature in the presence of two witnesses.

HARRY JAMES UPPERMAN.

Witnesses:
 H. C. EVERT,
 WM. C. HEITZ.